United States Patent
Kruglick (10) Patent No.: US 9,969,514 B2
(45) Date of Patent: May 15, 2018

(54) ORIENTATION-BASED HASHING FOR FAST ITEM ORIENTATION SENSING

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 133 days.

(21) Appl. No.: 14/737,416

(22) Filed: Jun. 11, 2015

(65) Prior Publication Data

US 2016/0362211 A1    Dec. 15, 2016

(51) Int. Cl.
| | |
|---|---|
| *B65B 57/02* | (2006.01) |
| *G05B 15/02* | (2006.01) |
| *G05B 19/418* | (2006.01) |
| *B65B 35/58* | (2006.01) |

(52) U.S. Cl.
CPC .............. *B65B 57/02* (2013.01); *G05B 15/02* (2013.01); *G05B 19/4183* (2013.01); *B65B 35/58* (2013.01); *G05B 2219/35084* (2013.01); *G05B 2219/40554* (2013.01); *Y02P 90/10* (2015.11)

(58) Field of Classification Search
USPC ....................................................... 700/225
See application file for complete search history.

(56) References Cited

U.S. PATENT DOCUMENTS

| | | | | | |
|---|---|---|---|---|---|
| 5,828,769 | A | * | 10/1998 | Burns .................... | G06K 9/685 340/5.1 |
| 6,711,293 | B1 | * | 3/2004 | Lowe .................. | G06K 9/4671 382/219 |
| 7,200,270 | B2 | * | 4/2007 | Yamaguchi .......... | G06K 9/6211 382/224 |
| 7,660,465 | B2 | * | 2/2010 | Yamaguchi .......... | G06K 9/4604 382/181 |
| 8,036,497 | B2 | * | 10/2011 | Kise .................. | G06F 17/30247 358/1.9 |
| 8,345,988 | B2 | | 1/2013 | Shan et al. | |

(Continued)

OTHER PUBLICATIONS

"Ishash 0.0.4dev," Python Software Foundation, accessed at https://pypi.python.org/pypi/Ishash/0.0.4dev, pp. 1-3 (May 7, 2015).

(Continued)

*Primary Examiner* — Kyle O Logan (57) ABSTRACT

Technologies are generally described for orientation-based hashing to determine item orientation. In some examples, a conveyance system may be configured to adjust the orientations of various types of items before sorting. The conveyance system may include a computer vision system that determines whether the orientation of an item should be adjusted based on an item-feature hash table that relates item image features to item orientations or actuator signals. In other examples, the computer vision system may determine item image features associated with a particular item and perform an item-feature hash table lookup using the item image features to determine an item orientation or actuator action. The item-feature hash table may be separately trained, allowing the computer vision system to rapidly determine the appropriate item orientation or actuator action.

21 Claims, 6 Drawing Sheets

(56) References Cited

U.S. PATENT DOCUMENTS

| | | | |
|---|---|---|---|
| 8,352,494 | B1 | 1/2013 | Badoiu |
| 8,655,029 | B2* | 2/2014 | Shiell ................. G06K 9/00281 382/118 |
| 2006/0204079 | A1* | 9/2006 | Yamaguchi .......... G06K 9/4604 382/154 |
| 2006/0251292 | A1* | 11/2006 | Gokturk ............ G06F 17/30253 382/103 |
| 2007/0217676 | A1* | 9/2007 | Grauman ............. G06K 9/4671 382/170 |
| 2008/0177764 | A1* | 7/2008 | Kise .................. G06F 17/30247 |
| 2009/0216755 | A1 | 8/2009 | Itamar |
| 2010/0026807 | A1 | 2/2010 | Saether et al. |
| 2012/0301009 | A1* | 11/2012 | Dabic ...................... G07D 3/14 382/136 |
| 2013/0046767 | A1* | 2/2013 | Lee ..................... G06F 17/3033 707/747 |
| 2013/0266195 | A1* | 10/2013 | Shiell ................. G06K 9/00281 382/118 |
| 2015/0010202 | A1* | 1/2015 | Tuzel .................... G06L 7/0046 382/103 |
| 2015/0254527 | A1* | 9/2015 | Pham ................. G06K 9/00214 382/203 |

OTHER PUBLICATIONS

"K-d tree," accessed at http://web.archive.org/web/20150428002333/https://en.wikipedia.org/wiki/K-d_tree, last modified on Apr. 24, 2015, pp. 1-10.

Bay, H. et al., "Speeded-Up Robust Features (SURF)", Computer Vision and Image Understanding, vol. 110, No. 3, pp. 346-359 (Jun. 2008).

Ke, Y. et al., "Efficient Near-duplicate Detection and SubimageRetrieval," Proceedings of ACM International Conference on Multimedia, pp. 869-876 (Aug. 2004).

Luo, Y., et al. "Decomposition-Based Transfer Distance Metric Learning for Image Classification," IEEE Transactions on Image Processing, vol. 23, Issue 9, pp. 3789-3801 (Jun. 23, 2014).

Monga, V. and Evans, B. L. "Perceptual Image Hashing via Feature Points: Performance Evaluation and Trade-offs," IEEE Transactions on Image Processing, vol. 15, No. 11, pp. 3452-3465 (Nov. 2006).

Shakhnarovich, G. et al. "Fast Pose Estimation with Parameter-sensitive Hashing," Ninth IEEE International Conference on Computer Vision, vol. 2, pp. 750-757 (2003).

Strauss, L. C. "A JPMorgan Value Fund Embraces Growth," accessed at http://online.barrons.com/articles/SB51367578116875004693704580488063627260520, Mar. 6, 2015, pp. 1-5.

Sun, Y. et al. "Learning Discriminative Dictionary for Group Sparse Representation," IEEE Transactions on Image Processing, Biometrics Compendium, vol. 23, Issue 9, pp. 3816-3828 (Jun. 18, 2014).

Wolfson, H. J., and Rigoutsos, I. "Geometric Hashing: An Overview," IEEE Computational Science and Engineering, vol. 4, Issue 4, pp. 10-21 (Oct.-Dec. 1997).

International Search Report and Written opinion for International Application No. PCT/US2016/034945, dated Sep. 2, 2016, pp. 7.

* cited by examiner

COMPUTER PROGRAM PRODUCT 600

SIGNAL-BEARING MEDIUM 602

604 AT LEAST ONE OF

ONE OR MORE INSTRUCTIONS TO USE TRAINING DATA TO DETERMINE FEATURE HASHES AND ASSOCIATED CONCLUSIONS;
    ONE OR MORE INSTRUCTIONS TO USE THE FEATURE HASHES AND CONCLUSIONS TO GENERATE AN ITEM-FEATURE HASH TABLE;
    ONE OR MORE INSTRUCTIONS TO DETERMINE AT LEAST ONE FEATURE ASSOCIATED WITH A STATE OF AN ITEM;
    ONE OR MORE INSTRUCTIONS TO DETERMINE A HASH VALUE BASED ON THE FEATURE(S);
    ONE OR MORE INSTRUCTIONS TO USE THE HASH VALUE AS A KEY FOR THE ITEM-FEATURE HASH TABLE TO DETERMINE AN ORIENTATION SIGNAL; AND
    ONE OR MORE INSTRUCTIONS TO PROVIDE THE ORIENTATION SIGNAL FOR ITEM ORIENTATION.

| COMPUTER-READABLE MEDIUM 606 | RECORDABLE MEDIUM 608 | COMMUNICATIONS MEDIUM 610 |

FIG. 6

ORIENTATION-BASED HASHING FOR FAST ITEM ORIENTATION SENSING

BACKGROUND

Unless otherwise indicated herein, the materials described in this section are not prior art to the claims in this application and are not admitted to be prior art by inclusion in this section.

Internet-based purchasing has grown as a result of the increasing variety of items available for online purchase. This increase in online purchasing has resulted in a commensurate increase in importance of "back-end" systems for handling and shipping items. In many situations, automated item handling systems, which may combine conveyor systems with vision systems, may be used to sort and pack objects with different shapes, sizes, and orientations.

SUMMARY

The present disclosure generally describes techniques to perform item orientation sensing through orientation-based hashing.

According to some examples, a system is provided to adjust item orientation. The system may include a memory module configured to store an item-feature hash table and an imaging module configured to determine at least one feature associated with an item. The system may further include an actuator configured to adjust an orientation of the item based on an actuation parameter, and a processor module coupled to the memory module, the imaging module, and the actuator. The processor module may be configured to determine a hash value based on the feature determined by the imaging module, determine the actuation parameter based on the hash value used as a key input into the item-feature hash table, and provide the actuation parameter to the actuator.

According to other examples, a system is provided to determine item orientation. The system may include a memory module configured to store an item-feature hash table, where the item-feature hash table may be configured to relate feature-hash values to item orientation parameters, and a processor module. The processor module may be configured to determine a first feature-hash value based on at least one feature associated with an item and determine a first item orientation parameter associated with the first feature-hash value from the item-feature hash table.

According to further examples, a method is provided to determine item orientation. The method may include determining at least one feature associated with an orientation of an item, determining a hash value based on the feature, and using the hash value as a key for an item-feature hash table to determine an orientation signal, where the item-feature hash table is configured to relate feature-hash values to item orientation parameters.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to item orientation sensing through orientation-based hashing.

Briefly stated, technologies are generally described for orientation-based hashing to determine item orientation. In some examples, a conveyance system may be configured to adjust the orientations of various types of items before sorting. The conveyance system may include a computer vision system that determines whether the orientation of an item should be adjusted based on an item-feature hash table that relates item image features to item orientations or actuator signals. In other examples, the computer vision system may determine item image features associated with a particular item and perform an item-feature hash table lookup using the item image features to determine an item orientation or actuator action. The item-feature hash table may be separately trained, allowing the computer vision system to rapidly determine the appropriate item orientation or actuator action.

Figure 1:
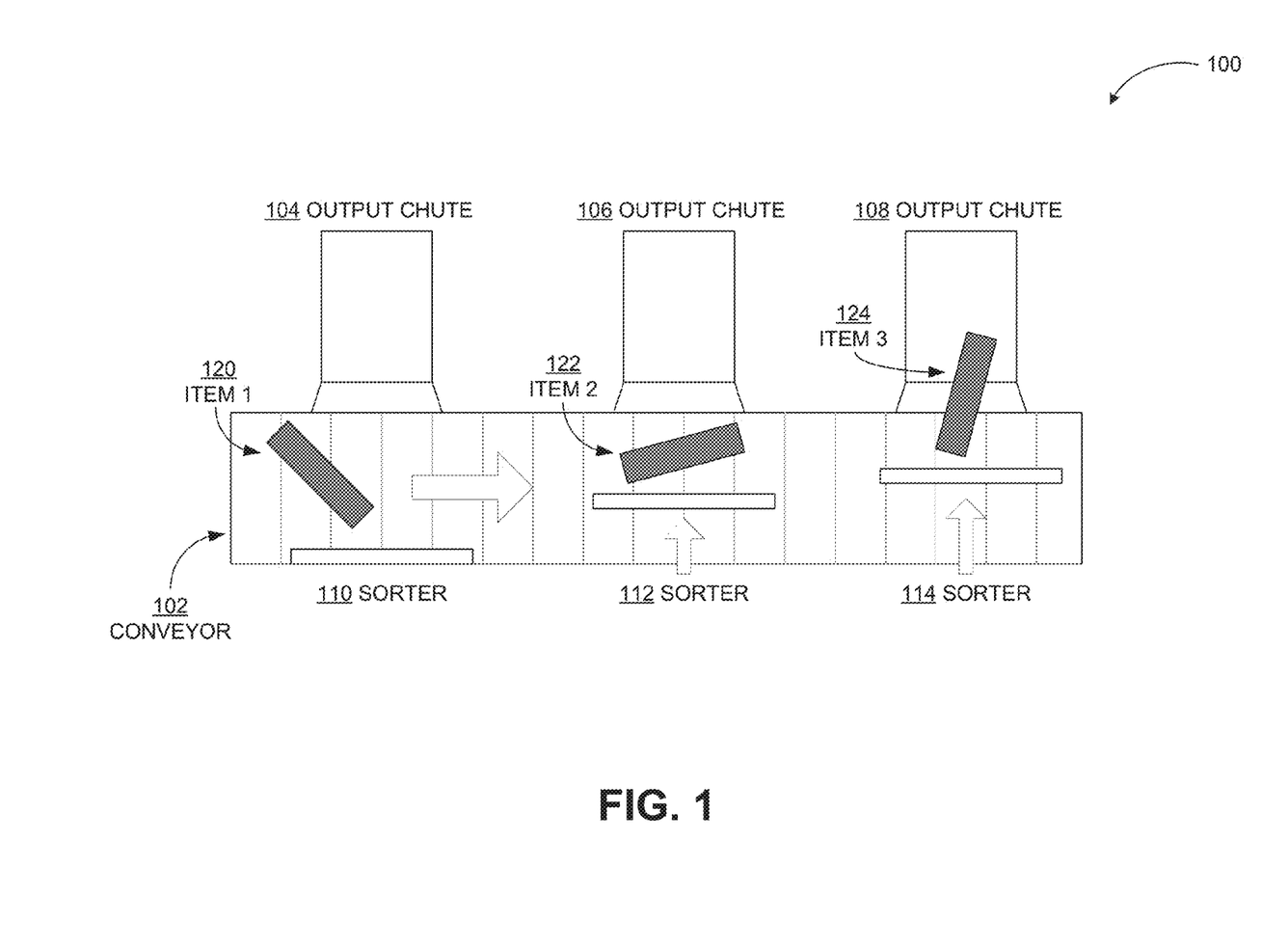
FIG. 1 illustrates an example conveyance system.

FIG. 1 illustrates an example conveyance system 100, arranged in accordance with at least some embodiments described herein.

The conveyance system 100, depicted in FIG. 1, may include a conveyor module 102 configured to transport a first item 120, a second item 122, and a third item 124 toward the right, as indicated by the large block arrow. The conveyor module 102 may be a conveyor belt system, a roller system, or any other suitable item transportation system. The conveyance system 100 may further include a sorter 110 configured to move items on the conveyor module 102 into an output chute 104, a sorter 112 configured to move items on the conveyor module 102 (for example, the second item 122) into an output chute 106, and a sorter 114 configured to move items on the conveyor module 102 (for example, the third item 124) into an output chute 108. The output chutes 104-108 may in turn connect to other systems for distribution, packing, and inspection of the items. For example, the output chutes 104-108 may connect to packaging systems configured to pack the items 120-124 for shipping to customers.

In some embodiments, items on the conveyor module 102 may not be able to fit into the output chutes 104-106 without adjustment. For example, as depicted in FIG. 1, the second item 122 may be substantially oriented along the movement direction of the conveyor module 102. As a result, the sorter 112 may not be able to fit the second item 122 into the output chute 106. In contrast, the third item 124, which may have the same dimensions as the second item 122, may be able to fit into the output chute 108 due to its orientation substantially perpendicular to the movement direction of the conveyor module 102. The orientations and actuation may be in vertical orientations or other orientations not shown herein. The vertical orientation is shown in the diagram for ease of representation in a flat drawing.

Figure 2:
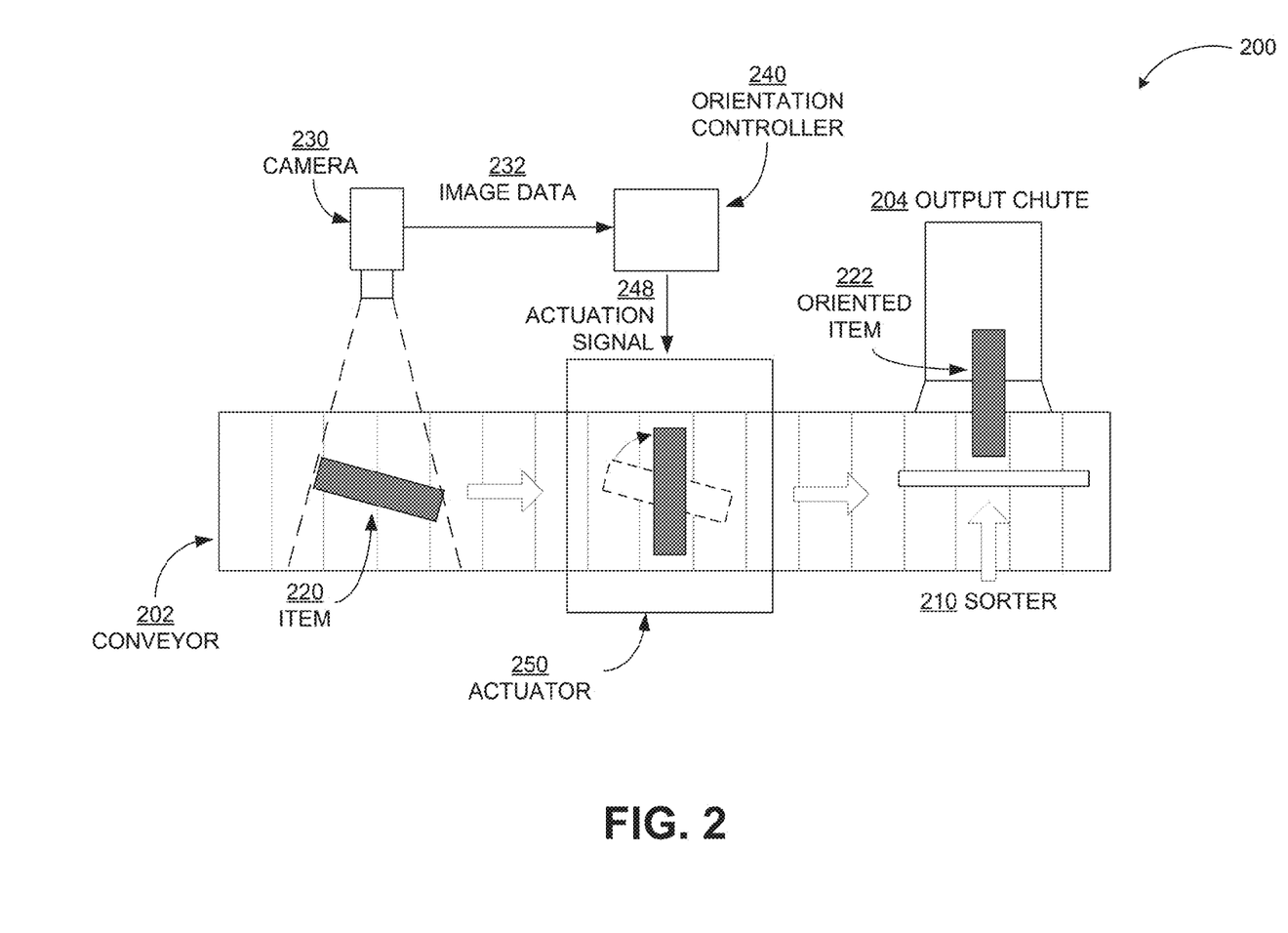
FIG. 2 illustrates an example conveyance system, where item orientation sensing and adjustment may be implemented.

FIG. 2 illustrates an example conveyance system 200, where item orientation sensing and adjustment may be implemented, arranged in accordance with at least some embodiments described herein.

The conveyance system 200, depicted in FIG. 2, may include a conveyor module 202, similar to the conveyor module 102, configured to transport an item 220 toward the right. The conveyance system 200 may include a sorter 210 similar to the sorters 110-114, and an output chute 204 similar to the output chutes 104-108.

The conveyance system 200 may further include a camera or imaging device 230, an actuator 250, and an orientation controller 240 coupled to the camera 230 and the actuator 250. In some embodiments, the camera 230, the orientation controller 240, and the actuator 250 may be configured to ensure that the item 220 is oriented so as to be able to fit into the output chute 204. The actuator 250 may be configured to adjust the orientation of items on the conveyor module 202, and the camera 230 may be disposed to detect and image items on the conveyor module 202 approaching the actuator 250. When the item 220 passes the camera 230 on the conveyor module 202, the camera 230 may detect the item 220 and record image data 232 associated with the item 220. The camera 230 may then provide the image data 232 to the orientation controller 240.

The orientation controller 240 may then use the received image data 232 to determine whether an actuation signal 248 should be sent to the actuator 250 to adjust the orientation of the item 220 on the conveyor module 202. For example, the orientation controller 240 may send the actuation signal 248 to the actuator 250 when the image data 232 indicates that the orientation of the item 220 is unsuitable for the output chute 204. When the image data 232 indicates that the orientation of the item 220 is suitable for the output chute 204, the orientation controller 240 may refrain from sending the actuation signal 248 to the actuator 250.

The actuator 250 may then adjust the orientation of the item 220 with respect to the conveyor module 202 based on the actuation signal 248 received from the orientation controller 240, resulting in an oriented item 222. In some embodiments, the actuator 250 may tilt and/or rotate (rotation of) the item 220 based on the actuation signal 248. Subsequently, the sorter 210 may move the oriented item 222 into the output chute 204 for further processing.

As described above, conveyance systems that implement item orientation sensing and adjustment may use a computer vision system to determine item orientation. For example, a computer vision system for determining item orientation may be configured to (a) process orientation-related features out of an image of an item, (b) recognize the type or identity of the item, (c) retrieve a three-dimensional model associated with the item, (d) use inverse kinematics and identified points to determine an item facing in the image, (e) match the item facing with an item orientation, and (f) output the item orientation. Such computer vision based processes may be fairly complex. Accordingly, many conveyance systems implementing item orientation sensing and adjustment may either have expensive, high-performance computer vision systems able to process items quickly or relatively inexpensive, low-performance computer vision systems that process items slowly.

In some embodiments, a conveyance system that implements item orientation sensing and adjustment may use a hashing method that directly translates item image features into an item orientation or suitable actuation signal. In these embodiments, an orientation controller such as the orientation controller 240 may be able to extract item features from the image data 232, use the item features or a representation of those features as key inputs into an item-feature hash table, and recover an item orientation or appropriate actuation signal (for example, the actuation signal 248) corresponding to the item features. Determining item orientation based on a hash table lookup may be significantly less computationally complex than the process for determining item orientation described above, and may therefore allow conveyance systems to implement item orientation sensing and adjustment using relatively inexpensive computer vision systems yet maintain high item throughput.

Figure 3:
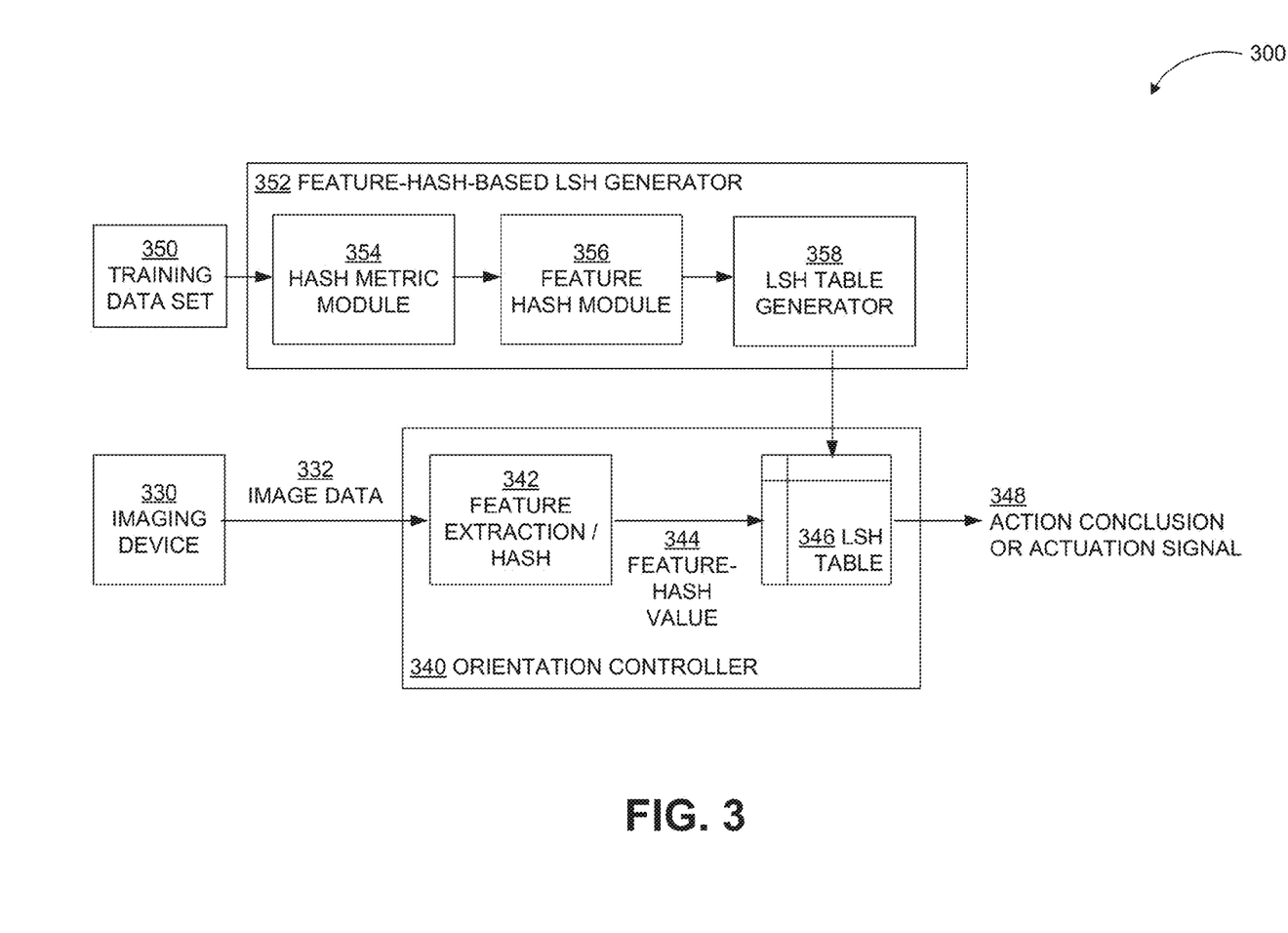
FIG. 3 illustrates an example system, where orientation-based hashing for item orientation sensing may be implemented.

FIG. 3 illustrates an example system 300, where orientation-based hashing for item orientation sensing may be implemented, arranged in accordance with at least some embodiments described herein.

The system 300 may include an imaging device 330, similar to the camera 230, coupled to an orientation controller 340, similar to the orientation controller 240. The imaging device 330 may be configured to detect and image an item on a conveyor such as the conveyor module 202 to generate image data 332 associated with the item, and may then transmit the image data 332 to the orientation controller 340. The orientation controller 340 in turn may be configured to generate an action conclusion or actuation signal 348, similar to the actuation signal 248, that may instruct an actuator (for example, the actuator 250) to adjust the orientation of the item. The imaging device 330 may be a laser scanner, nonvisible light camera, or any other sensing device suitable for the generation of item recognition features.

In some embodiments, the orientation controller 340 generates the action conclusion or actuation signal 348 from the image data 332 using a hash lookup approach. In some examples, the orientation controller 340 may use a locality-sensitive hashing (LSH) approach, in which some output hashes from a hash function may be generally similar if the inputs corresponding to those output hashes are similar in qualities that are of interest.

The orientation controller 340 may first use a feature extraction/hash module 342 to generate a hashed representation of the item associated with the image data 332, also referred to as a feature-hash value of the item. The feature extraction/hash module 342 may be configured to first extract, from the image data 332, one or more viewable features associated with the item and potentially representative of item orientation. For example, in some embodiments, one or more particular viewable features may be uniquely associated with a particular orientation of the item, and detection of those particular viewable features in the image of the item may allow the orientation to be identified. In some embodiments, the viewable features may be "perceptual" features, which may be specifically selected to be durable to changes in angle, illumination, and/or fuzziness in the image data 332. These perceptual features may be insensitive to image variations such as changes in focus, distance, and/or lighting.

In some embodiments, the feature extraction/hash module 342 may be configured to extract viewable features from the image data 332 using a speeded-up robust features (SURF) process, a scale-invariant feature transform (SIFT) process, a histogram of oriented gradients (HOG) process, or any other suitable process for extracting features from image data. The feature extraction/hash module 342 may then use the extracted SURF, SIFT, and/or HOG features as input into a hash function to derive a feature-hash value 344. The orientation controller 340 may then use the feature-hash value 344 as input into an LSH table 346, which may be stored in a memory of the orientation controller 340, to determine the action conclusion or actuation signal 348, which may then be sent to an actuator.

While examples are described herein using locality-sensitive hashing, embodiments are not limited to implementations with conventional applications of a hash. "Hash", as used herein, refers to any compact representation such as a digest, cryptographic hash, or properties based summary. Hashes are not required to be unique representations and different features may possibly hash to the same value.

In other embodiments, a feature-hash-based LSH generator 352 may generate the LSH table 346 and the hash function used by the feature extraction/hash module 342. The LSH generator 352 may first use a hash metric module 354 to determine a hash metric associated with qualities of interest (for example, qualities related to spatial orientation) for relevant items. In further embodiments, the hash metric module 354 may have access to a training data set 350 that includes example image-orientation pairs that associate particular item features with particular item orientations. The hash metric module 354 may then use the training data set 350 and possibly other external data to determine an appropriate hash metric and hash subspace (via, for example, hyperplane sectioning) that separates out the relevant qualities of interest. In some embodiments, the determined hash metric may be specifically associated with particular items or item types, and the determined hash metric may not be appropriate for other, different item types.

Upon determination of the hash metric, the hash metric module 354 may then determine an appropriate hash transformation from the training data set 350 to the hash metric by decomposition of other source metrics and/or a set of random bases and/or into one or more eigenvectors and an associated hashing algorithm. The hash metric module 354 may then provide the eigenvectors to a feature hash module 356, which may be able to use the eigenvectors to generate feature hash values from viewable features derived from the image-orientation pairs in the training data set 350. The feature hash module 356 may then provide the feature hash values to an LSH table generator 358, which may also receive the hashing algorithm determined by the hash metric module 354.

The LSH table generator 358 may then generate the LSH table 346 by using the hashing algorithm to group the feature hash values. The LSH table 346 may take the form of a single-entry hash table, a multiple-entry hash table, or a cuckoo hash table, depending on the desired memory efficiency. In some embodiments, the LSH table generator 358 may collect multiple orientations and associated viewable features related to individual items and collapse feature hash values corresponding to similar orientations in the multiple orientations into the same or nearby hash buckets within the LSH table 346. The LSH table generator 358 may further associate hash buckets within the LSH table 346 with specific item orientation parameters, which may include orientations, action conclusions, and/or actuation signals. In some embodiments, an "action conclusion" may differ from an "actuation signal" in that the "action conclusion" may describe a particular action (for example, "rotate clockwise by 90°"), whereas the "actuation signal" may be a signal that instructs an actuator to perform the particular action. Subsequently, the LSH table generator 358 may provide the LSH hash table 346 or access to the LSH hash table 346 to the orientation controller 340.

In yet other embodiments, the LSH table generator 358 may generate the LSH hash table 346 based on parameter sketching. Generating a hash table based on parameter sketching may reduce the overall size of the hash table by storing a data set summary instead of the entire dataset, and may result in a hash of an abbreviated form of an actual parameter of interest. In some embodiments, the LSH table generator 358 may attempt to generate the LSH hash table 346 using sparse matrices to account for potentially high dimensionalities associated with the viewable feature data extracted by the feature extraction/hash module 342.

While the hash-based lookup approach described herein is described specifically with respect to determining item orientation, in other embodiments this approach may be generalized to any type of optical recognition. For example, images of "good" or "spoiled" food items may be used to generate an LSH table as described above, and a monitoring system may be able to use the LSH table to directly evaluate whether a particular food item is "good" or "spoiled". Other evaluation states that may be encoded into a hash table may include acceptability of material or product quality, alignment of parts, gaps and fittings, or other visible evaluations that may otherwise be conducted by computer vision.

Figure 4:
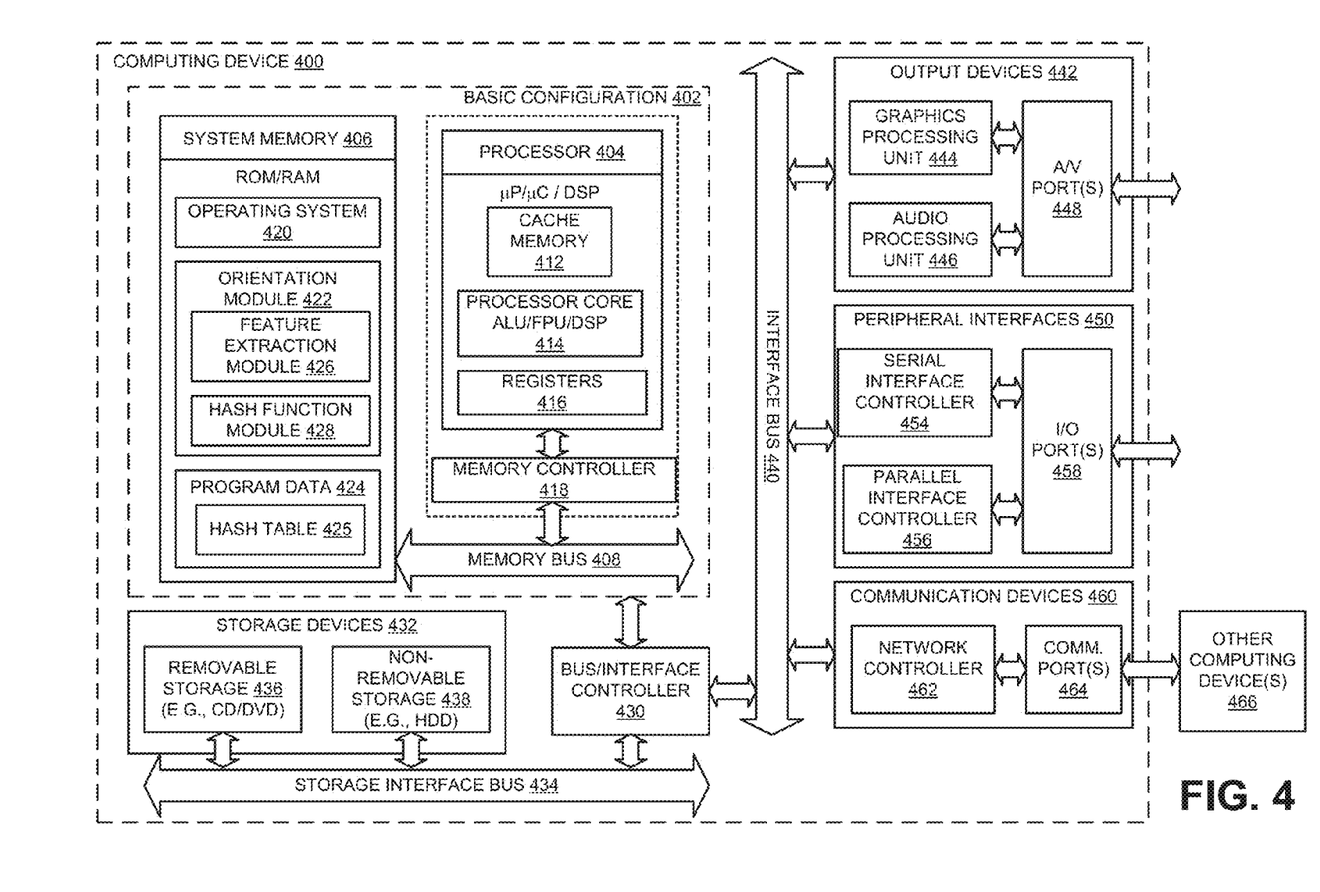
FIG. 4 illustrates a general purpose computing device, which may be used to provide item orientation sensing using orientation-based hashing.

FIG. 4 illustrates a general purpose computing device, which may be used to provide item orientation sensing using orientation-based hashing, arranged in accordance with at least some embodiments described herein.

For example, the computing device 400 may be used to perform item orientation sensing using orientation-based hashing as described herein. In an example basic configuration 402, the computing device 400 may include one or more processors 404 and a system memory 406. A memory bus 408 may be used to communicate between the processor 404 and the system memory 406. The basic configuration 402 is illustrated in FIG. 4 by those components within the inner dashed line.

Depending on the desired configuration, the processor 404 may be of any type, including but not limited to a microprocessor (µP), a microcontroller (µC), a digital signal processor (DSP), or any combination thereof. The processor 404 may include one more levels of caching, such as a level cache memory 412, a processor core 414, and registers 416. The example processor core 414 may include an arithmetic logic unit (ALU), a floating point unit (FPU), a digital signal processing core (DSP Core), or any combination thereof. An example memory controller 418 may also be used with the processor 404, or in some implementations, the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 may include an operating system 420, an orientation module 422, and program data 424. The orientation module 422 may include a feature extraction module 426 and a hash function module 428 to perform item orientation identification based on orientation-based hashing as described herein. The program data 424 may include, among other data, a hash table 425 or the like, as described herein.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (e.g., one or more output devices 442, one or more peripheral interfaces 444, and one or more communication devices 466) to the basic configuration 402 via the bus/interface controller 430. Some of the example output devices 442 include a graphics processing unit 448 and an audio processing unit 450, which may be configured to communicate to various external devices such as a display or speakers via one or more A/V ports 452. One or more example peripheral interfaces 444 may include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 466 includes a network controller 460, which may be arranged to facilitate communications with one or more other computing devices 462 over a network communication link via one or more communication ports 464. The one or more other computing devices 462 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a part of a general purpose or specialized server, mainframe, or similar computer that includes any of the above functions. The computing device 400 may also be implemented as a personal computer including both laptop computer and non-laptop computer configurations.

Figure 5:
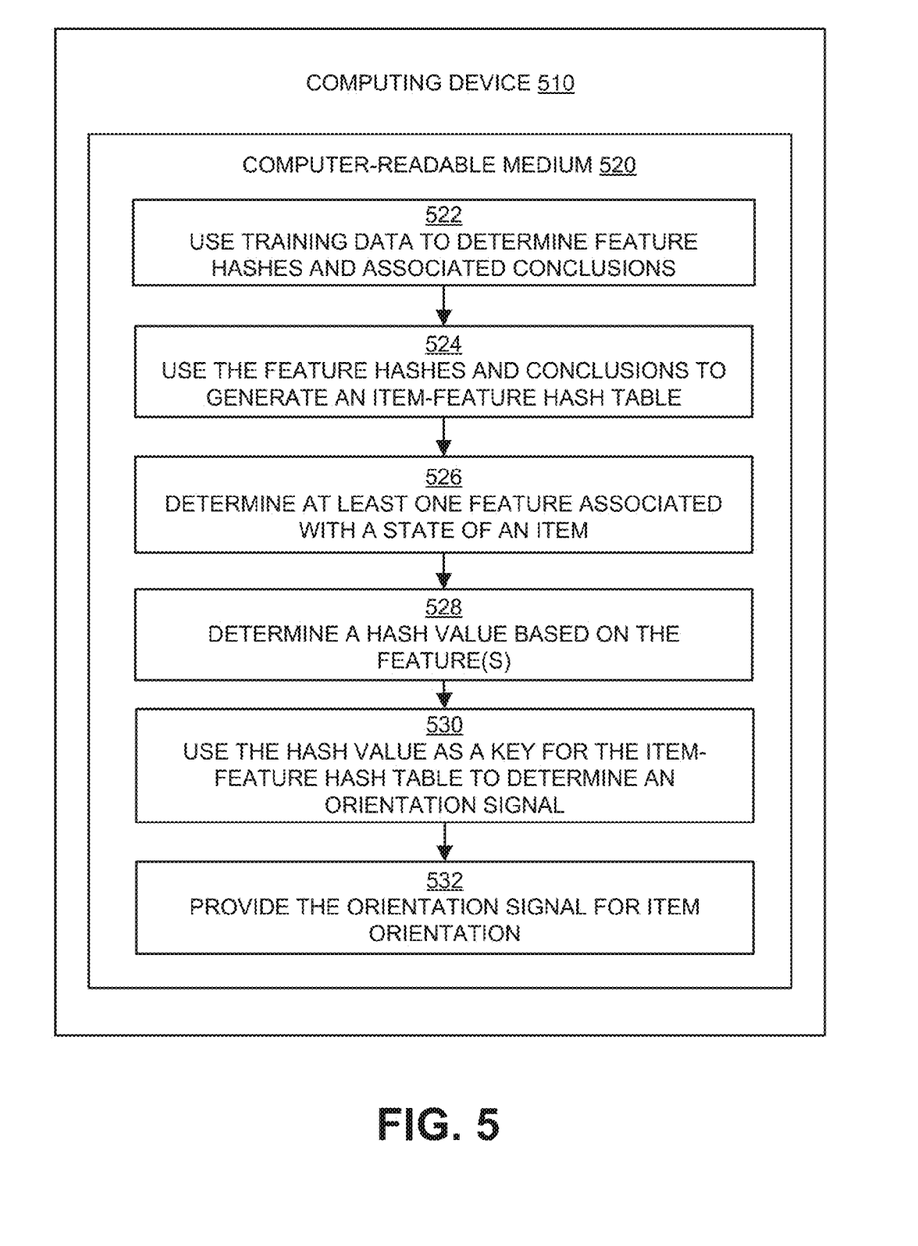
FIG. 5 is a flow diagram that illustrates an example method to provide item orientation sensing using orientation-based hashing that may be performed by a computing device such as the computing device in FIG. 4.

FIG. 5 is a flow diagram that illustrates an example method for providing item orientation sensing using orientation-based hashing that may be performed by a computing device such as the computing device in FIG. 4, arranged in accordance with at least some embodiments described herein.

Example methods may include one or more operations, functions or actions as illustrated by one or more of blocks 522, 524, 526, 528, 530, and/or 532, and may in some embodiments be performed by a computing device such as the computing device 400 in FIG. 4. The operations described in the blocks 522-532 may also be stored as computer-executable instructions in a computer-readable medium such as a computer-readable medium 520 of a computing device 510.

An example process to provide item orientation sensing using orientation-based hashing may begin with block 522, "USE TRAINING DATA TO DETERMINE FEATURE HASHES AND ASSOCIATED CONCLUSIONS", where a feature-hash-based locality-sensitive hash (LSH) generator may use training data to determine feature hashes associated with item image data. In some embodiments, the feature-hash-based LSH generator may determine a hash metric and use the hash metric to determine a hash transformation from the training data. The LSH generator may then generate feature hashes using the hash transformation and the training data. In some embodiments, the feature-hash-based LSH generator may also determine one or more action conclusions and/or actuation signals associated with the feature hashes, as described above.

Block 522 may be followed by block 524, "USE THE FEATURE HASHES AND CONCLUSIONS TO GENERATE AN ITEM-FEATURE HASH TABLE", where the LSH generator may use the generated feature hashes and determined action conclusions and/or actuation signals to generate an item-feature hash table, such as the LSH table 346 described above.

Block 524 may be followed by block 526, "DETERMINE AT LEAST ONE FEATURE ASSOCIATED WITH A STATE OF AN ITEM", where an orientation controller (for example, the orientation controller 340) or an imaging device (for example, the imaging device 330) may determine one or more viewable features associated with an image of an item, as described above. In some embodiments, the viewable features may be associated (uniquely or not) with particular orientations or states of the item. Thus, a state of a target item may be identified using the results of hashes of a number of features, where each feature may be associated with multiple possible states. For example, a "voting" system may be used in some implementations, where 50 features may provide 25 votes for one orientation, 30 votes for another orientation, and 40 votes for the correct one. Each feature may therefore be associated with multiple orientations.

Block 526 may be followed by block 528, "DETERMINE A HASH VALUE BASED ON THE FEATURE(S)", where the orientation controller or a feature extraction/hash module of the orientation controller (for example, the feature extraction/hash module 342) may generate a feature hash value using the viewable feature(s) determined in block 526 and the hash transformation of block 522, as described above.

Block 528 may be followed by block 530, "USE THE HASH VALUE AS A KEY FOR THE ITEM-FEATURE HASH TABLE TO DETERMINE AN ORIENTATION SIGNAL", where the orientation controller may use the feature hash value generated in block 528 as an input into the item-feature hash table generated in block 524 to determine an orientation signal associated with the feature hash value, as described above. In some embodiments, the orientation signal may include an indication of the orientation of the item, an action conclusion associated with the orientation, and/or an actuation signal associated with the orientation.

Block 530 may be followed by block 532, "PROVIDE THE ORIENTATION SIGNAL FOR ITEM ORIENTATION", where the orientation controller may provide the orientation signal to an actuator or some other entity to orient the item. For example, the orientation controller may provide the orientation signal to an actuator configured to adjust the orientation of the item, as described above.

Figure 6:
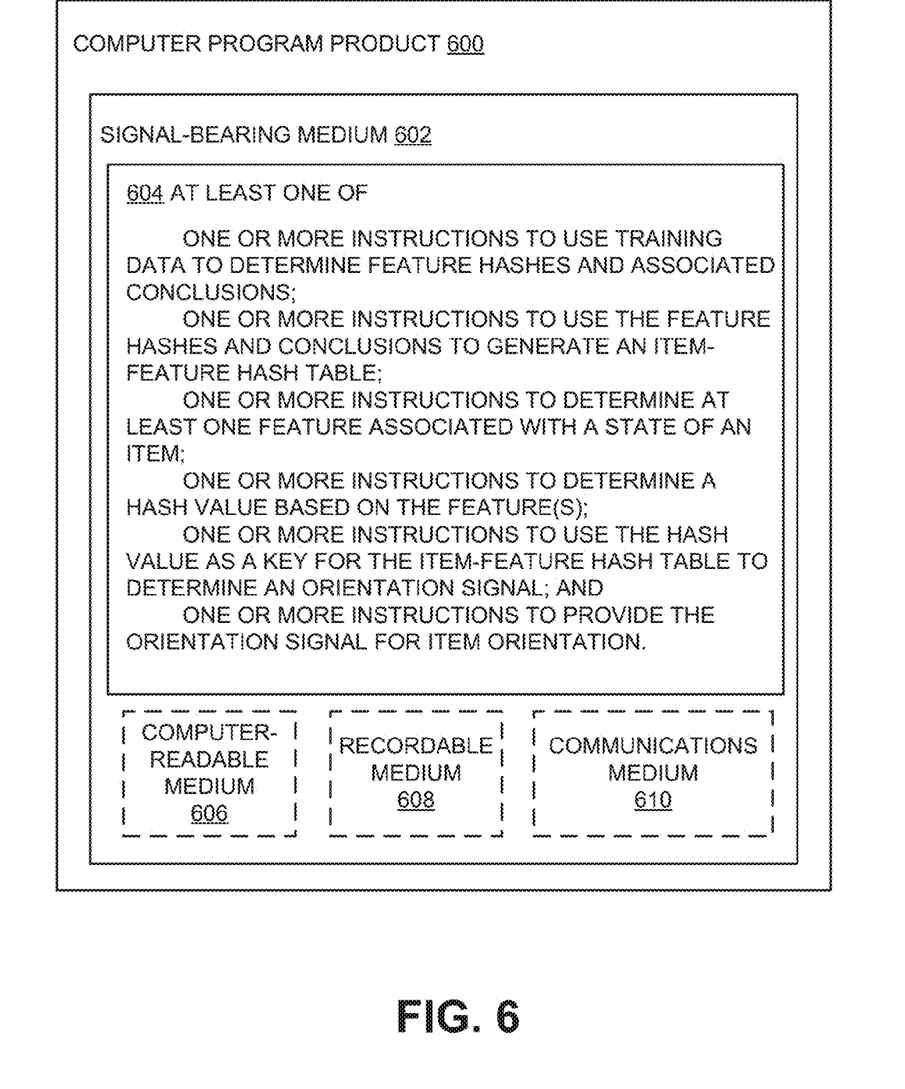
FIG. 6 illustrates a block diagram of an example computer program product, all arranged in accordance with at least some embodiments described herein.

FIG. 6 illustrates a block diagram of an example computer program product, arranged in accordance with at least some embodiments described herein.

In some examples, as shown in FIG. 6, a computer program product 600 may include a signal bearing medium 602 that may also include one or more machine readable instructions 604 that, when executed by, for example, a processor may provide the functionality described herein. Thus, for example, referring to the processor 404 in FIG. 4, the orientation module 422 may undertake one or more of the tasks shown in FIG. 6 in response to the instructions 604 conveyed to the processor 404 by the medium 602 to perform actions associated with item orientation sensing using orientation-based hashing as described herein. Some of those instructions may include, for example, instructions to use training data to determine feature hashes and associated conclusions, use the feature hashes and conclusions to generate an item-feature hash table, determine at least one feature associated with an orientation or state of an item, determine a hash value based on the feature, use the hash value as a key for the item-feature hash table to determine an orientation signal, and/or provide the orientation signal for item orientation, according to some embodiments described herein.

In some implementations, the signal bearing media 602 depicted in FIG. 6 may encompass computer-readable media 606, such as, but not limited to, a hard disk drive, a solid state drive, a compact disc (CD), a digital versatile disk (DVD), a digital tape, memory, etc. In some implementations, the signal bearing media 602 may encompass recordable media 607, such as, but not limited to, memory, read/write (R/W) CDs, R/W DVDs, etc. In some implementations, the signal bearing media 602 may encompass communications media 610, such as, but not limited to, a digital and/or an analog communication medium (e.g., a fiber optic cable, a waveguide, a wired communications link, a wireless communication link, etc.). Thus, for example, the program product 600 may be conveyed to one or more modules of the processor 404 by an RF signal bearing medium, where the signal bearing media 602 is conveyed by the wireless communications media 610 (e.g., a wireless communications medium conforming with the IEEE 802.11 standard).

According to some examples, a system is provided to adjust item orientation. The system may include a memory module configured to store an item-feature hash table and an imaging module configured to determine at least one feature associated with an item. The system may further include an actuator configured to adjust an orientation of the item based on an actuation parameter, and a processor module coupled to the memory module, the imaging module, and the actuator. The processor module may be configured to determine a hash value based on the feature determined by the imaging module, determine the actuation parameter based on the hash value used as a key input into the item-feature hash table, and provide the actuation parameter to the actuator.

According to some embodiments, the actuator may be configured to adjust the orientation of the item through a tilt and/or rotation of the item. The system may further include a conveyor module configured to transport the item, where the actuator may be configured to adjust the orientation of the item with respect to the conveyor module.

According to other embodiments, the at least one feature may be associated with a particular orientation of the item. The imaging module may be configured to determine the at least one feature by use of a speeded-up robust features (SURF) process, a scale-invariant feature transform (SIFT) process, and/or a histogram of oriented gradients (HOG) process. The item-feature hash table may be configured to group similar actuation parameters into nearby hash buckets. In some embodiments, the item-feature hash table may be implemented by use of locality-sensitive hashing and/or parameter sketching. The item-feature hash table may be a single-entry hash table, a multiple-entry hash table, or a cuckoo hash table.

According to other examples, a system is provided to determine item orientation. The system may include a memory module configured to store an item-feature hash table, where the item-feature hash table may be configured to relate feature-hash values to item orientation parameters, and a processor module. The processor module may be configured to determine a first feature-hash value based on at least one feature associated with an item and determine a first item orientation parameter associated with the first feature-hash value from the item-feature hash table.

According to some embodiments, the at least one feature may be uniquely associated with a particular orientation of the item. The at least one feature may be a SURF feature, a SIFT feature, and/or a HOG feature. In some embodiments, similar item orientation parameters may be grouped into nearby hash buckets within the item-feature hash table. The item-feature hash table may be implemented by use of locality-sensitive hashing and/or parameter sketching. In some embodiments, the item-feature hash table may be a single-entry hash table, a multiple-entry hash table, or a cuckoo hash table. The first item orientation parameter may indicate an orientation of the item and/or an actuation signal associated with the item.

According to further examples, a method is provided to determine item orientation. The method may include determining at least one feature associated with an orientation of an item, determining a hash value based on the feature, and using the hash value as a key for an item-feature hash table to determine an orientation signal, where the item-feature hash table is configured to relate feature-hash values to item orientation parameters.

According to some embodiments, the at least one feature may be a SURF feature, a SIFT feature, and/or a HOG feature. The method may further include generating the item-feature hash table based on locality-sensitive hashing and/or parameter sketching. Generating the item-feature hash table may further include generating the item-feature hash table using sparse matrices. In some embodiments, generating the item-feature hash table may include collecting, for at least one item, multiple orientations and associated features, and determining at least one hash transformation configured to collapse multiple, similar orientations in the multiple orientations together into nearby hash buckets. Determining the at least one hash transformation may include determining at least one hash metric based on a type of the item, performing a decomposition based on the at least one hash metric to form at least one eigenvector, and using the at least one eigenvector to collapse the multiple, similar orientations together.

According to other embodiments, the item-feature hash table may be a single-entry hash table, a multiple-entry hash table, or a cuckoo hash table. The orientation signal may indicate an orientation of the item and/or an actuation signal associated with the item.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a compact disc (CD), a digital versatile disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors to move and/or adjust components and/or quantities).

A data processing system may be implemented utilizing any suitable commercially available components, such as those found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system configured to adjust item orientation, the system comprising:
   a memory configured to store an item-feature hash table;
   an imager device configured to determine at least one feature associated with an item;
   an actuator; and
   a processor coupled to the memory, the imager device, and the actuator, wherein the processor is configured to:
      determine a hash value based on the at least one feature determined by the imager device;
      determine an actuation signal based on the hash value which is used as a key input into the item-feature hash table; and
      provide the actuation signal to the actuator,
      wherein the actuator is configured to adjust an orientation of the item based on the actuation signal that is determined based on the hash value.

2. The system of claim 1, wherein the at least one feature is associated with a particular orientation of the item.

3. The system of claim 1, wherein the imager device is configured to determine the at least one feature by use of at least one of:
   a speeded-up robust features (SURF) process;
   a scale-invariant feature transform (SIFT) process; and
   a histogram of oriented gradients (HOG) process.

4. The system of claim 1, wherein the item-feature hash table is configured to group similar actuation signals into nearby hash buckets.

5. The system of claim 1, wherein the item-feature hash table is implemented by use of locality-sensitive hashing and/or parameter sketching.

6. The system of claim 1, wherein the item-feature hash table includes one of a single-entry hash table, a multiple-entry hash table, and a cuckoo hash table.

7. The system of claim 1, wherein the actuator is configured to adjust the orientation of the item through at least one of a tilt and a rotation of the item.

8. The system of claim 7, further comprising a conveyor module configured to transport the item, wherein the actuator is configured to adjust the orientation of the item with respect to the conveyor module.

9. A system configured to adjust item orientation, the system comprising:
a memory configured to store an item-feature hash table, wherein the item-feature hash table is configured to relate feature-hash values to item orientation parameters; and
a processor operatively coupled to the memory and configured to perform or control performance of:
collect multiple orientations associated with an item;
determine feature-hash value based on the collected multiple orientations associated with the item, wherein the multiple orientations include a vertical position of the item, a horizontal position of the item, or a tilted position of the item, with respect to a coordinate axis;
determine item orientation parameters associated with the feature-hash values from the item-feature hash table; and
adjust, based on the determined item orientation parameters, at least one of the multiple orientations associated with the item.

10. The system of claim 9, wherein to determine the feature-hash values, the processor is configured to perform or control performance of:
determine at least one feature associated with a particular orientation of the item, wherein the at least one feature includes at least one of a speeded-up robust feature (SURF) feature, a scale-invariant feature transform (SIFT) feature, and a histogram of oriented gradients (HOG) feature.

11. The system of claim 9, wherein the item-feature hash table includes one of a single-entry hash table, a multiple-entry hash table, and a cuckoo hash table.

12. The system of claim 9, wherein the item orientation parameters indicate at least one of an orientation of the item and an actuation signal associated with the item.

13. A system configured to determine item orientation, the system comprising:
a memory configured to store an item-feature hash table, wherein the item-feature hash table is configured to relate feature-hash values to item orientation parameters; and
a processor operatively coupled to the memory and configured to perform or control performance of:
determine a feature-hash value based on at least one feature associated with an item;
determine, from the item-feature hash table, an item orientation parameter associated with the feature-hash value, wherein the item orientation parameters, which are similar, are grouped into nearby hash buckets within the item-feature hash table; and
determine an actuation signal based on the item orientation parameter associated with the feature-hash value.

14. A system configured to determine an item orientation, the system comprising:
a memory configured to store an item-feature hash table, wherein the item-feature hash table is configured to relate feature-hash values to item orientation parameters;
an imager device operatively coupled to the memory and configured to determine at least one feature associated with an orientation of an item; and
a processor operatively coupled to the memory and the imager device, and configured to perform or control performance of:
determine a feature-hash value based on the at least one feature associated with the orientation of the item;
determine an orientation signal by use of the feature-hash value as a key for the item-feature hash table;
provide the orientation signal to an actuator; and
adjust, via the actuator and based on the determined orientation signal, the orientation of the item.

15. A method to adjust item orientation, the method comprising:
determining, by an imager device, at least one feature associated with an orientation of an item;
determining, by an orientation controller operatively coupled to the imager device, a hash value based on the at least one feature;
determining, by the orientation controller, an orientation signal by use of the hash value as a key for an item-feature hash table, wherein the item-feature hash table is configured to relate feature-hash values to item orientation parameters, and wherein the item-feature hash table is generated based on locality-sensitive hashing and/or parameter sketching;
providing, by the orientation controller, the orientation signal to an actuator; and
adjusting, by the actuator based on the orientation signal, the orientation of the item, wherein the adjustment of the orientation of the item facilitates the item being fitted into an output chute of a system that is configured for at least one of a distribution, packaging, and inspection of the item.

16. The method of claim 15, wherein determining the at least one feature includes determining at least one of a speeded-up robust feature (SURF) feature, a scale-invariant feature transform (SIFT) feature, and a histogram of oriented gradients (HOG) feature.

17. The method of claim 15, wherein the generation of the item-feature hash table is further based on sparse matrices.

18. The method of claim 15, wherein the item-feature hash table includes one of a single-entry hash table, a multiple-entry hash table, and a cuckoo hash table.

19. The method of claim 15, wherein determining the orientation signal includes determining an orientation signal that indicates at least one of the orientation of the item and an actuation signal associated with the item.

20. The method of claim 15, wherein the generation of the item-feature hash table comprises:
collecting, for at least one item, a plurality of orientations and associated features; and
determining at least one hash transformation configured to collapse multiple similar orientations in the plurality of orientations together into nearby hash buckets.

21. The method of claim 20, wherein determining the at least one hash transformation comprises:
determining at least one hash metric based on a type of the item;
performing a decomposition based on the at least one hash metric to form at least one eigenvector; and
using the at least one eigenvector to collapse the multiple similar orientations of the plurality of orientations together.

* * * * *